Dec. 16, 1930.  B. R. WRIGHT  1,784,953
LIQUID FLOW REGULATOR FOR CENTRIFUGES
Filed April 30, 1928
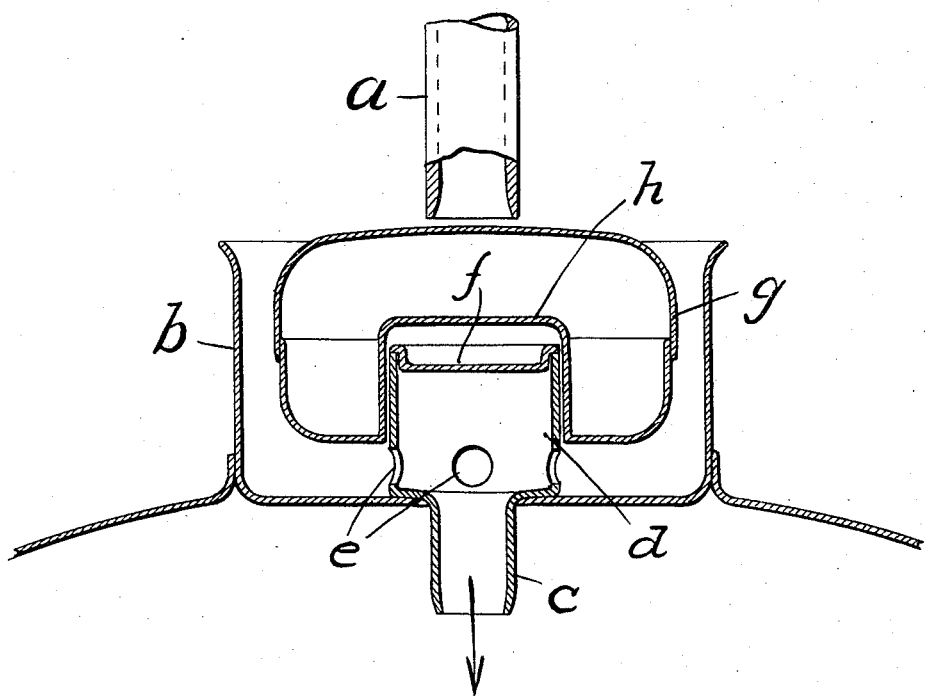
WITNESS:
INVENTOR
Bert R. Wright
BY
Busser and Harding
ATTORNEYS.

Patented Dec. 16, 1930

1,784,953

UNITED STATES PATENT OFFICE

BERT R. WRIGHT, OF POUGHKEEPSIE, NEW YORK, ASSIGNOR TO THE DE LAVAL SEPARATOR COMPANY, OF NEW YORK, N. Y., A CORPORATION OF NEW JERSEY

LIQUID-FLOW REGULATOR FOR CENTRIFUGES

Application filed April 30, 1928. Serial No. 273,912.

This invention relates to floats for controlling the flow of liquid to a centrifugal machine.

The object of the invention is to provide a float that will not pulsate (dance up and down), rock or have other irregular or vibratory motions, but which will change its vertical position slowly and to the substantially imperceptible degree required to regulate the flow, thereby not only insuring a uniform feed to the centrifuge, but also avoiding spattering, overflow of the regulating cup and other objectionable actions characteristic of the operation of ordinary floats.

The drawing is a vertical sectional view of a float valve and appurtenant parts embodying my invention.

Below the lower end of a tube $a$ from a supply can (not shown) is a receiving cup $b$ provided with an outlet tube which comprises a contracted lower neck $c$ extending below the cup, an enlarged upper extension $d$, and an annular shoulder connecting these parts which rests on the bottom of the cup. The extension $d$ has holes $e$ at or near its bottom, through which holes the liquid flows from cup $c$ into the outlet tube. Loosely fitting in and closing the top of the extension is a plug $f$.

The float comprises an external shell $g$ and an internal inverted cylinder $h$, which together form a hollow body having a cylindrical recess extending upward from its bottom. The cylinder $h$ fits loosely around the extension $d$.

In operation, liquid flows from the tube $a$ onto, over, around and under the float, whence part of it flows out through the hole $e$ and regulating tube $c$ and the remainder fills the cup $b$. As the liquid rises in the cup, the float is lifted until it approaches so close to the tube $a$ that it reduces the flow through it and prevents overflowing the cup. The float fits closely enough around the extension $d$ that it is so guided thereby as to prevent its tipping up on one side and down on the other. The space between the plug $f$ and the top of the cylinder $h$ acts as a dash pot to stop sudden vertical movements and so prevent dancing. After the float reaches the position required to give the desired rate of flow, it remains almost stationary, the variations in vertical position being slight and substantially imperceptible.

Having now fully described my invention, what I claim and desire to protect by Letters Patent is:

1. In a liquid flow regulating device, the combination with a cup having an outlet nozzle and, extending upward from the bottom of the cup, a cylindrical member with a closed top, of a float having, projecting inward from the bottom thereof, a cylindrical member adapted to be guided by and slide over said cylindrical member and by coaction therewith to form a dash pot substantially sealed against entrance and exit of gases.

2. In a liquid flow regulating device, the combination with a cup having a bottom outlet and an upwardly extending member adapted to act as a guiding piston, of a float having integral therewith a cylinder adapted to be guided by said piston and providing above said piston a space substantially sealed against entrance and exit of gases, whereby the movements of the float are substantially retarded by said piston.

3. In a liquid flow regulating device, the combination with a supply tube and a cup having an outlet, of a float, and means adapted to guide the float in its vertical movement, prevent tipping and provide a space below the central part of the float substantially sealed against entrance and exit of gases and thus retard said vertical movements.

4. In a liquid flow regulating device, the combination with a cup, of a cylindrical member therein having an inlet to receive liquid from the cup and a liquid outlet, and a hollow body float having in its bottom a recess into which said cylindrical member extends and affords for the cup a dash pot guide providing a space substantially sealed against the entrance and exit of gases.

5. In a liquid flow regulating device, the combination with a cup; of a hollow cylindrical member therein having a substantially closed top, a port through which liquid flows into said member from the cup and a liquid outlet; and a float comprising a hollow body having in its bottom a cylindrical recess into which said tubular member extends and provides above it a closed space substantially sealed against entrance and exit of gases, thereby affording a guide with which the float is in dash pot relation.

6. In a liquid flow regulating device, the combination with a cup, of a feed tube, an outlet nozzle including a tubular member within the cup having a closed upper end and provided with holes through which liquid flows from the cup into the outlet nozzle, and a float comprising an external shell and an internal cylinder having a closed top and which is slidable vertically on said tubular member.

7. In a liquid flow regulating device, the combination with a receiving cup open at its top and having an outlet in its bottom, a tubular member whose interior communicates with the interior of the cup and which has a liquid outlet, and a float comprising a hollow body having a central part extending over the tubular member and having also a depending annular part surrounding and slidable on the tubular member, whereby the tubular member and float are in dash pot relation.

8. In a liquid flow regulating device for centrifuges, the combination with a receiving cup open at its top and having an outlet in its bottom, a hollow tubular member positioned in the cup above said outlet and having lateral orifices communicating with the interior of the cup above the cup bottom, a float comprising an upper hollow body extending over the tubular member and a depending annular hollow body surrounding and slidable on the tubular member, and a downwardly extending feed tube having an outlet end positioned over the float and adapted to discharge liquid onto the top of the float and thence laterally through the annular space between the periphery of the feed tube and the top of the float, the float being adapted to contact with the outlet end of the feed tube to prevent overflowing of the cup and to regulate the rate of inflow of liquid to the cup by the variation in the width of said annular space, the hollow tubular member having a closed top spaced from the lower wall of the upper hollow body of the float.

9. In a liquid flow regulating device for centrifuges, the combination with a receiving cup open at its top and having an orifice in its bottom, an outlet tube comprising a contracted lower neck extending through and below said orifice and an upper member of greater diameter within the cup having an annular shoulder resting on the bottom of the cup adjacent the periphery of said orifice, said upper member of the outlet tube being provided with perforations above and adjacent said shoulder, a float comprising an upper hollow body extending over the enlarged upper member of the outlet tube and having also a depending annular hollow body surrounding and slidable on the enlarged upper member of the outlet tube, a downwardly extending feed tube having an outlet end positioned over the float and in vertical alignment with the outlet tube and adapted to discharge liquid onto the top of the float and thence laterally through the annular space between the periphery of the feed tube and the top of the float, the float being adapted to contact with the outlet end of the feed tube to prevent overflowing of the cup and to regulate the rate of liquid feed to the cup by the variation in the width of said annular space, and a plug loosely fitting in and closing the top of the enlarged upper member of the outlet tube.

In testimony of which invention, I have hereunto set my hand, at Poughkeepsie, New York, on this 25 day of April, 1928.

BERT R. WRIGHT.